(12) United States Patent
Kfoury et al.

(10) Patent No.: US 12,296,464 B2
(45) Date of Patent: May 13, 2025

(54) GRIPPER

(71) Applicant: COMMISSARIAT A L'ENERGIE ATOMIQUE ET AUX ENERGIES ALTERNATIVES, Paris (FR)

(72) Inventors: Fares Kfoury, Gif-sur-Yvette (FR); Mathieu Grossard, Gif-sur-Yvette (FR)

(73) Assignee: COMMISSARIAT A L'ENERGIE ATOMIQUE ET AUXENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/706,893

(22) PCT Filed: Nov. 3, 2022

(86) PCT No.: PCT/EP2022/080731
§ 371 (c)(1),
(2) Date: May 2, 2024

(87) PCT Pub. No.: WO2023/079028
PCT Pub. Date: May 11, 2023

(65) Prior Publication Data
US 2024/0416533 A1 Dec. 19, 2024

(30) Foreign Application Priority Data
Nov. 4, 2021 (FR) ...................................... 2111735

(51) Int. Cl.
*B25J 15/10* (2006.01)
*B25J 15/00* (2006.01)
*B25J 15/02* (2006.01)

(52) U.S. Cl.
CPC ............. *B25J 15/10* (2013.01); *B25J 15/008* (2013.01); *B25J 15/024* (2013.01)

(58) Field of Classification Search
CPC .............. B25J 15/0009; B25J 15/0206; B25J 15/0213; B25J 15/022; B25J 15/024; B25J 15/10; B25J 15/103; A61F 2/586
(Continued)

(56) References Cited

U.S. PATENT DOCUMENTS 3,690,714 A * 9/1972 Farmer .................. B66F 9/184
294/198
9,132,555 B2 * 9/2015 Nakayama ............... B25J 15/12
(Continued)

FOREIGN PATENT DOCUMENTS

DE 102014223118 A1 5/2016
EP 1595658 A1 11/2005
(Continued)

OTHER PUBLICATIONS

International Search Report of PCT/EP2022/080731 dated Mar. 3, 2023 [PCT/ISA/210].

*Primary Examiner* — James R Bidwell
(74) *Attorney, Agent, or Firm* — Sughrue Mion, PLLC (57) ABSTRACT

A gripper having a frame and a finger with a first distal phalanx and a second proximal phalanx articulated on about a first axis. The first phalanx and the second phalanx connected to enable a rotation of the first phalanx about a second axis substantially parallel to the first axis, such that the finger can pass from an opening configuration to a clamping configuration, when the first phalanx and/or the second phalanx performs a rotation in a first direction relative to the frame. The finger having a controllable adhesion element.

21 Claims, 11 Drawing Sheets

(58) Field of Classification Search
USPC .................................................. 294/106, 198
See application file for complete search history.

(56) References Cited

U.S. PATENT DOCUMENTS

| | | | |
|---|---|---|---|
| 2010/0156125 A1* | 6/2010 | Lee ..................... | B25J 15/0009 901/32 |
| 2014/0197652 A1 | 7/2014 | Wang et al. | |
| 2018/0036145 A1 | 2/2018 | Jury et al. | |

FOREIGN PATENT DOCUMENTS

| | | |
|---|---|---|
| EP | 3457995 B1 | 4/2020 |
| JP | 2014-076522 A | 5/2014 |

\* cited by examiner

GRIPPER

CROSS REFERENCE TO RELATED APPLICATIONS

This application is a National Stage of International Application No. PCT/EP2022/080731 filed on Nov. 3, 2022, claiming priority based on French Patent Application No. 2111735 filed on Nov. 4, 2021.

The present invention relates to the field of handling, and more specifically, the field of gripping.

BACKGROUND OF THE INVENTION

Conventionally, a gripper comprises a clamp comprising a frame on which a proximal end of an actuated finger is articulated. The distal end of the finger comprises a jaw generally provided with a non-slip surface. The finger is generally rectilinear or curved. Such a clamp is particularly adapted to gripping objects of similar geometry and ideally predefined. Such a clamp lacks versatility, particularly for gripping special objects like large, flat objects, or objects having a cylindrical or conical portion. It is thus necessary to change the clamp for a tool adapted to such special objects.

Rapid clamp change devices have made it possible to reduce the immobilisation times of grippers. However, the multiplicity of tools for special objects makes such rapid change devices expensive and bulky.

AIM OF THE INVENTION

The invention aims, in particular, to improve the versatility of a gripper.

SUMMARY OF THE INVENTION

To this end, a gripper is provided, comprising a frame and an actuated finger, the finger comprising a first distal phalanx and a second proximal phalanx which is articulated on the frame about a first axis, the first phalanx and the second phalanx being mechanically connected to enable a rotation of the first phalanx about a second axis substantially parallel to the first axis, such that the finger can pass from an opening configuration to a clamping configuration when the first phalanx and/or the second phalanx performs a rotation in a first direction relative to the frame. According to the invention, the finger comprises a controllable adhesion element, the gripper comprising a first abutment to limit a first angular stroke of a first rotation of the first phalanx about the second axis in a second direction opposite the first direction, the first angular stroke comprises a first angular sector which is strictly positive in the second direction and measured from a first plane comprising the first axis and the second axis.

A gripper is obtained, the capacity of which to exercise a gripping by adhesion has an improved versatility and enable the gripping of special objects for which the clamping is insufficient to ensure a stable gripping. The gripping tool change times, as well as the storage space for special gripping tools are reduced and the costs and handler sizes implementing such grippers are reduced.

Optionally, the gripper comprises a control unit to control the adhesion element.

This makes it possible for the adhesion element, in particular, to exercise a gripping force on a targeted object.

Optionally, the first abutment is an elastic abutment.

A substantial improvement of the versatility of the gripper is obtained, when the adhesion element is arranged to exert a gripping force in a direction substantially orthogonal to the first axis.

Advantageously, the adhesion element is secured to the first phalanx.

A light and economical embodiment is obtained when the finger is under-actuated and when it comprises at least one first member for returning a phalanx to a position bringing to the opening configuration of the finger.

The device thus enables the handling of non-grippable objects—such as flat objects—since the gripper comprises a first abutment to limit a first angular stroke of a first rotation of the first phalanx about the second axis in a second direction opposite the first direction.

The angular sector is advantageously comprised between ten and ninety degrees, preferably between twenty and sixty degrees.

Advantageously, the gripper comprises a second member for returning the first phalanx to exert a third return force which brings the first phalanx from a position located in the first angular sector to a position bringing to the opening configuration of the finger.

The device is easily adaptable, when the second return member comprises means for adjusting an over-opening position of the first phalanx from which the third return force is exerted.

The device is easily adaptable, when the second return member comprises means for adjusting an over-opening position of the first phalanx from which the third return force is exerted.

A simple design is obtained when the second return member comprises a spring and when the means for adjusting the over-opening position comprise a cable of adjustable length connected to an end of the spring.

The versatility of the gripper is improved when the finger comprises a third intermediate phalanx articulated, on the one hand on the second phalanx about a third axis substantially parallel to the first axis.

The gripper is more transparent and has an improved reversibility of the actuation which enables an accurate return and a control by force by direct measurement of the motor current when the second phalanx comprises a first bar comprising a first end pivotingly connected to the first phalanx and a second end pivotingly mounted on the frame about the first axis, and when the second phalanx also comprises a linear actuator comprising a third end pivotingly connected to the first phalanx and a fourth end pivotingly mounted on the frame, the first bar and the linear actuator being arranged to form a first deformable quadrilateral wherein a distance separating the third end from the fourth end can be modified.

The compactness of the gripper is improved when the third phalanx comprises a second bar comprising a fifth end articulated on the first phalanx and a sixth end articulated on a first connecting rod, the third phalanx also comprising a third bar comprising a seventh end articulated on the first phalanx and an eighth end articulated on the first connecting rod, the first end and the third end being articulated at the first connecting rod.

The compactness of the gripper is also improved when a projected orthogonal of the third end on a straight line connecting the first end and the eighth end belongs to a segment connecting the first end and the eighth end.

Also, the compactness of the gripper is improved when the first end is articulated on the sixth end.

Advantageously, the second phalanx comprises a first member for returning the finger to the opening configuration and/or the third phalanx comprises a second member for returning the finger to the opening configuration. Advantageously, also, the return member comprises an elastic element.

Advantageously, the linear actuator comprises a screw jack, preferably a jack comprising a ball screw.

The hyperstaticity of the mechanism is reduced when the first bar and/or the linear actuator is connected to the finger by a sliding pivot-type connection with limited sliding of third axis substantially parallel to the first axis.

The accuracy of the gripper is improved when the gripper comprises at least one rotary coder.

The invention also relates to a gripping device which comprises a plurality of grippers of the type described above.

The gripping device is particularly versatile when each finger of the plurality of grippers is articulated on its frame about a fourth axis substantially orthogonal to the first axis, even when a rotation of each finger relative to the frame about the fourth axis is actuated.

The versatility of the gripping device is also improved when each finger of the plurality of fingers is also slidingly mounted relative to the frame, even when a translation of each finger relative to the frame is actuated.

Other features and advantages of the invention will emerge upon reading the description below of a particular and non-limiting embodiment/implementation of the invention.

BRIEF DESCRIPTION OF THE DRAWINGS

Reference will be made to the accompanying drawings, among which.

DETAILED DESCRIPTION OF THE INVENTION

In reference to FIGS. 1 to 4, and according to a first embodiment which does not form part of the invention such as claimed, but which details the components intervening in the invention, the gripper according to the invention, and generally referenced 1, comprises a frame 2 and an actuated finger 3. The finger 3 comprises a first distal phalanx 10 and a second proximal phalanx 20 articulated on the frame 2 about a first axis O1. In this case, the phalanx 10 and the phalanx 20 are mechanically connected by a third phalanx 30 to enable a rotation of the phalanx 10 about a second axis O2 substantially parallel to the first axis O1.

Figure 1:
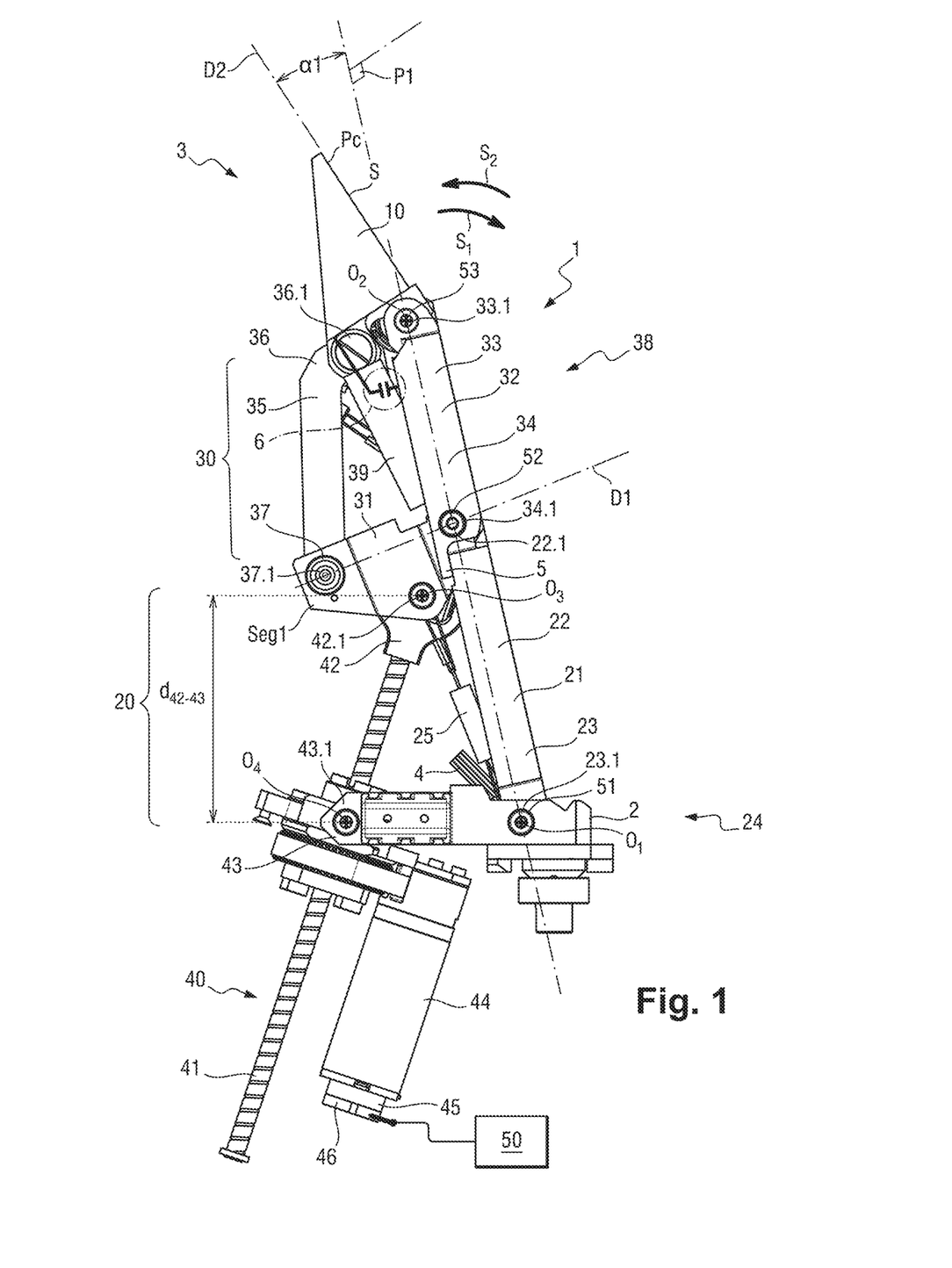
FIG. 1 is a schematic, planar representation of a gripper according to a first embodiment of the invention.
Figure 2:
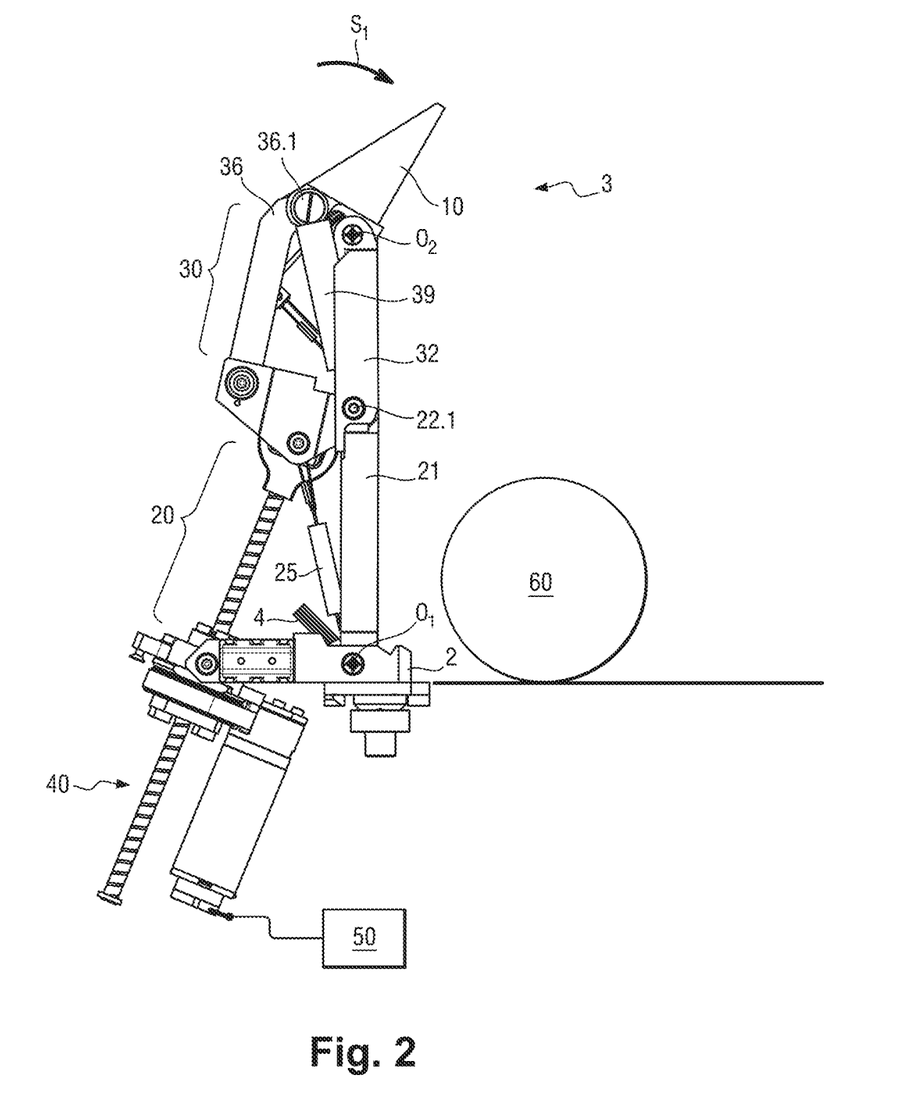
FIG. 2 is a schematic representation of the gripper of FIG. 1 in a first clamping phase.

The phalanx 20 comprises a first bar 21 comprising a first end 22 pivotingly connected at a first pivot point 22.1 to the phalanx 10 by way of a connecting rod 31 of the phalanx 30. The bar 21 also comprises a second end 23 articulated on the frame 2 about the axis O1 at a second pivot point 23.1. The phalanx 20 also comprises a first linear actuator—in this case, a ball screw 41 jack 40—comprising a third end 42 connected at a third pivot point 42.1 pivotingly to the connecting rod 31 and a fourth end 43 pivotingly mounted on the frame 2 at a fourth pivot point 43.1. The jack 40 comprises a geared motor 44 provided with a first rotary coder 45 and a current sensor 46. The geared motor 44, the coder 45 and the sensor 46 are connected to a control unit 50.

As it appears in FIG. 1, the bar 21 and the jack 40 are arranged to form a first deformable quadrilateral 24 wherein a distance d42-43 separating the end 42 from the end 43 can be modified.

Thus, the first deformable quadrilateral 24 comprises the frame 2, the connecting rod 31, the bar 21 and the actuator 40 which acts as a last bar of modifiable length of the quadrilateral 24.

In this case, the pivot points 42.1 and 43.1 connecting the jack 40 respectively to the finger 3 and to the chassis 2 each perform a sliding pivot-type connection with limited sliding about respectively a third axis O3 and a fourth axis O4 substantially parallel to the first axis O1. The sliding about the third axis O3 and the fourth axis O4 is called limited, in that the amplitude of the sliding is limited by abutments (not represented).

The phalanx 30 comprises a second bar 32 comprising a fifth end 33 articulated on the phalanx 10 at a fifth pivot point 33.1 and a sixth end 34 articulated on the connecting rod 31 at a sixth pivot point 34.1 combined with the point 22.1. The phalanx 30 also comprises a third bar 35 comprising a seventh end 36 articulated at a seventh pivot point 36.1 on the phalanx 10 and an eighth end 37 articulated at an eighth pivot point 37.1 on the connecting rod 31. The connecting rod 31, the phalanx 10, the second bar 32 and the third bar 35 form a second deformable quadrilateral 38.

As can be seen in FIG. 1, a projected orthogonal of the third end 42 on a first straight line D1 connecting the first end 22 and the eighth end 37 belongs to a segment Seg1 connecting the first end 22 and the eighth end 37.

The second phalanx 20 comprises a first traction spring 25 which extends between the point 23.1 and the point 42.1 to reduce the length of the diagonal of the quadrilateral 24, namely the distance separating the points 23.1 from the point 42.1 to the opening configuration.

The frame 2 comprises an abutment 4 against which the bar 21 is born under the effect of the jack 40 when the latter controls an opening movement of the finger 3. The abutment 4 thus limits the amplitude of the rotation of the bar 21 about the axis O1 in a second direction S2 opposite the first direction S1.

The third phalanx 30 comprises a second traction spring 39 which extends between the point 22.1 and the point 36.1 to reduce the length of the diagonal of the quadrilateral 38, namely the distance separating the points 22.1 from the point 36.1.

The bar 32 comprises an abutment 5 which projects from the end 34. The abutment 5 is born against the bar 21 under the effect of the spring 25 which exerts a first return force of the bar 32. The abutment 5 thus limits the amplitude of the rotation of the bar 32 about the point 34.1 in the second direction S2 to the opening configuration.

The phalanx 10 comprises an abutment 6 which is born against the bar 32 under the effect of the spring 39. The abutment 6 thus limits the amplitude of the rotation of the phalanx 10 about the axis O2 in the second direction S2. In this case, the abutment 6 blocks the rotation of the phalanx 10 about the axis O2 when the phalanx 10 is positioned, such that an angle $\alpha 1$ measured between a first plane P1 comprising the axis O1 and the axis O2 and a second straight line D2 orthogonal to the axis O2 and which passes through a contact point Pc of the phalanx 10—in the case of a phalanx 10 having a flat contact surface S, the contact point is any point of the flat surface S—is equal to ten degrees.

Finally, the pivot points 22.1, 23.1 and 33.1 respectively comprise a second rotary coder 51, a third rotary coder 52 and a fourth rotary coder 53 connected to the unit 50.

The operation of the gripper 1 will now be described in application to the clamping of an object 60 (in this case, cylindrically-shaped) and in reference to FIGS. 1 to 4.

According to a first step, the unit 50 controls the jack 40 so as to make the finger 3 pass into an opening configuration represented in FIG. 1. To do this, the unit 50 can, according to the step of the screw 41, control a retraction of the screw 41 or cut the power supply of the geared motor 44. The finger 3 thus adopts its opening configuration under the effect of the springs 25 and 39 which respectively bring the bar 21, the bar 32 and the phalanx 10 in contact with the abutments 4, 5 and 6. Once the object 60 is presented to the gripper 1, and according to a second step, the unit 50 controls the jack 40 so as to deploy the screw 41—i.e. so as to increase the distance separating the points 23.1 and 42.1. The finger 3 thus performs a rotation about the first axis O1 in a first direction S1. Under the action of the springs 25 and 39 which maintain the bar 32 and the phalanx 10 respectively in contact with the abutments 5 and 6, the rotation of the finger 3 consists of a rotation of the bar 21 about the axis O1, the other elements of the finger 3 remaining immobile relative to the bar 21. In particular, the phalanxes 10 and 30 are immobile against one another, as well as relative to the bar 21. Once the bar 21 of the phalanx 20 comes into contact with the object 60, the deployment of the screw 41 causes a rotation of the phalanx 30 relative to the phalanx 20 about the point 22.1 (FIG. 2) in the direction S1. Subjected to the action of the spring 39, the phalanx 10 is maintained against the abutment 6 and remains immobile relative to the phalanx 30.

Figure 3:
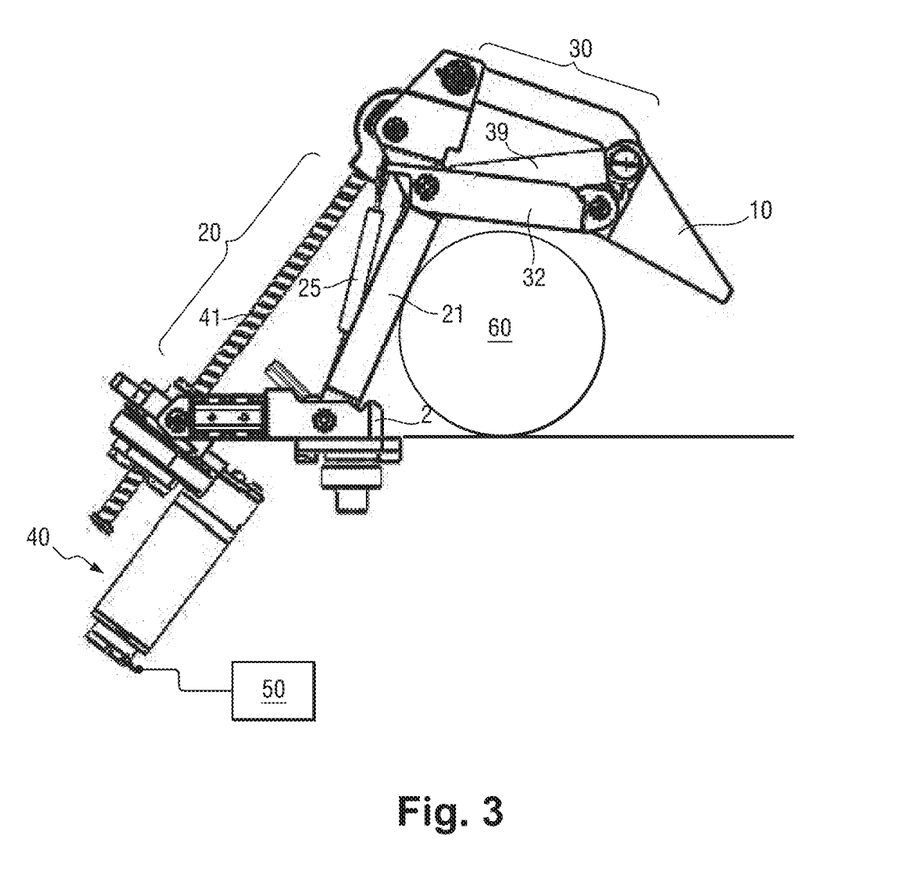
FIG. 3 is a schematic representation of the gripper of FIG. 1 in a second clamping phase.
Figure 4:
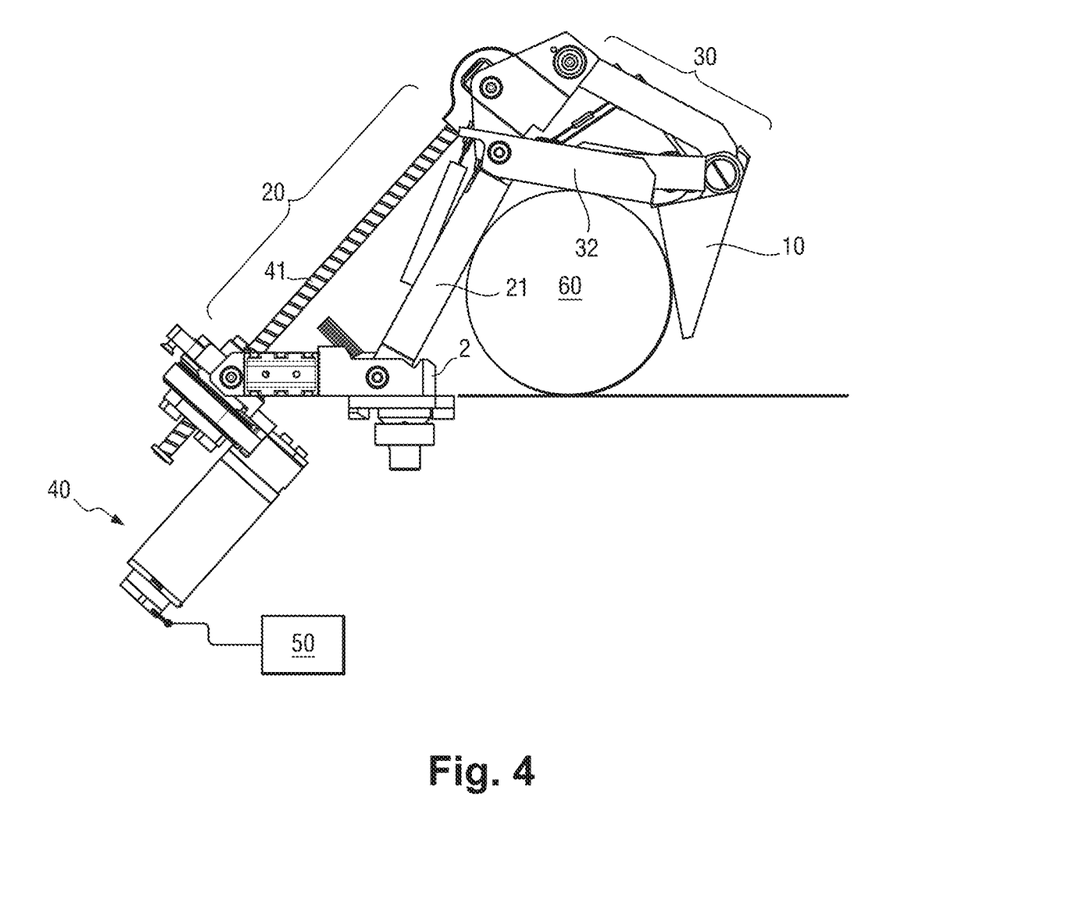
FIG. 4 is a schematic representation of the gripper of FIG. 1 in a third clamping phase.

The continuation of the deployment of the screw 41 leads to the coming of the bar 32 of the phalanx 30 into contact with the object 60 (FIG. 3). According to a third step, with the rotation of the phalanx 30 being blocked, the phalanx 10 starts a rotation in the direction S1 about the axis O2 until coming into contact with the object 60 (FIG. 4). The control unit 50, based on the information coming from the coders 45, 51, 52 and 53, as well as the from the current sensor 46, determines the positions of the phalanxes 10, 20 and 30, the force applied to the end of the screw 41 and calculates a clamping force applied by clamping applied by each of the phalanxes 10, 20, 30 of the finger 3 on the object 60. It is thus possible to define and control a maximum clamping force to apply on the object 60. The opening of the gripper 1 is done by controlling a retraction of the screw 41. The opening of the gripper 1 follows the reverse order of the clamping steps.

Elements identical or similar to those described above will have a numerical reference identical to that in the description below of two other embodiments of the invention.

Figure 5:
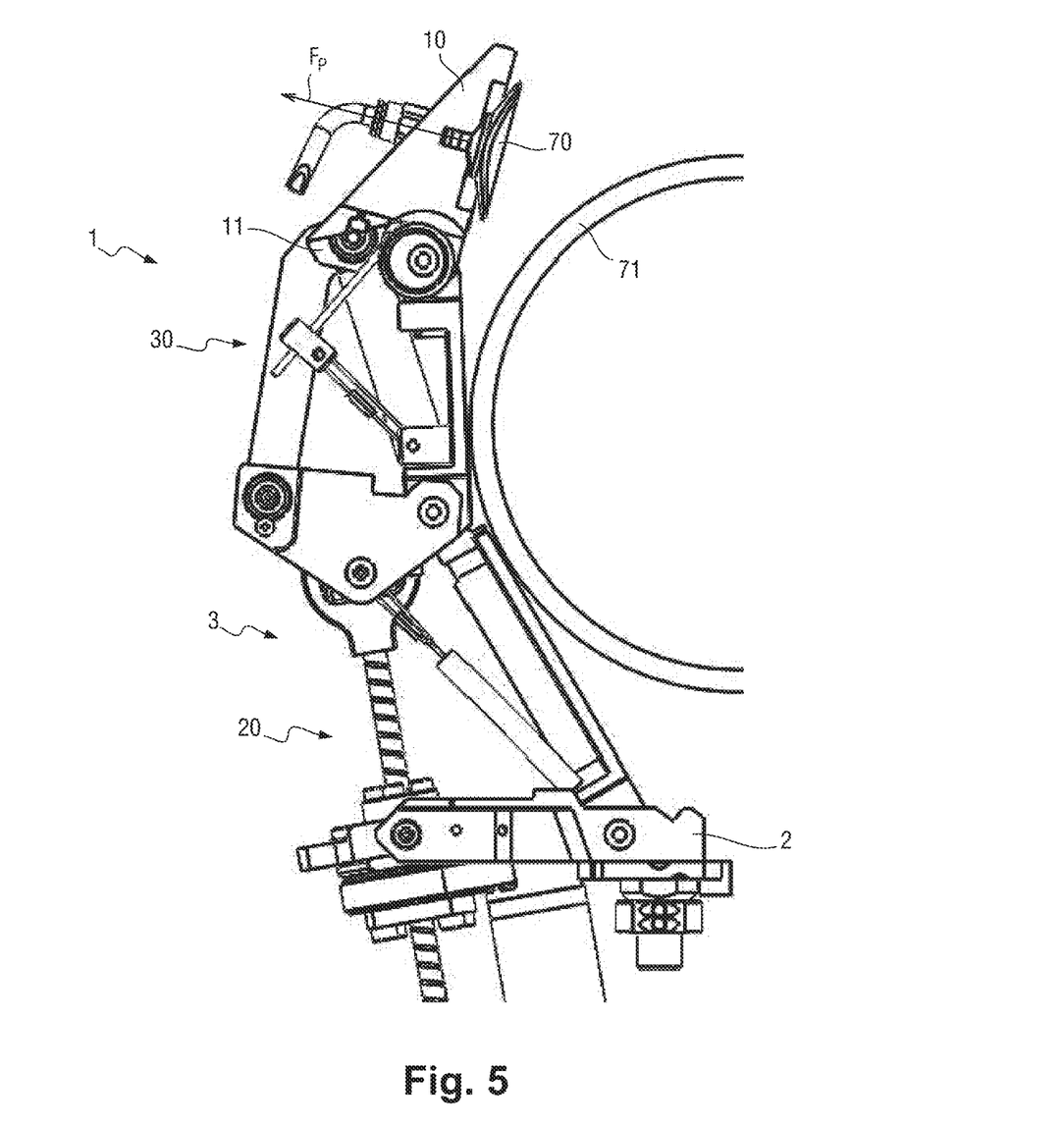
FIG. 5 is a schematic, planar representation of a gripper according to a second embodiment of the invention in a clamping configuration.
Figure 6:
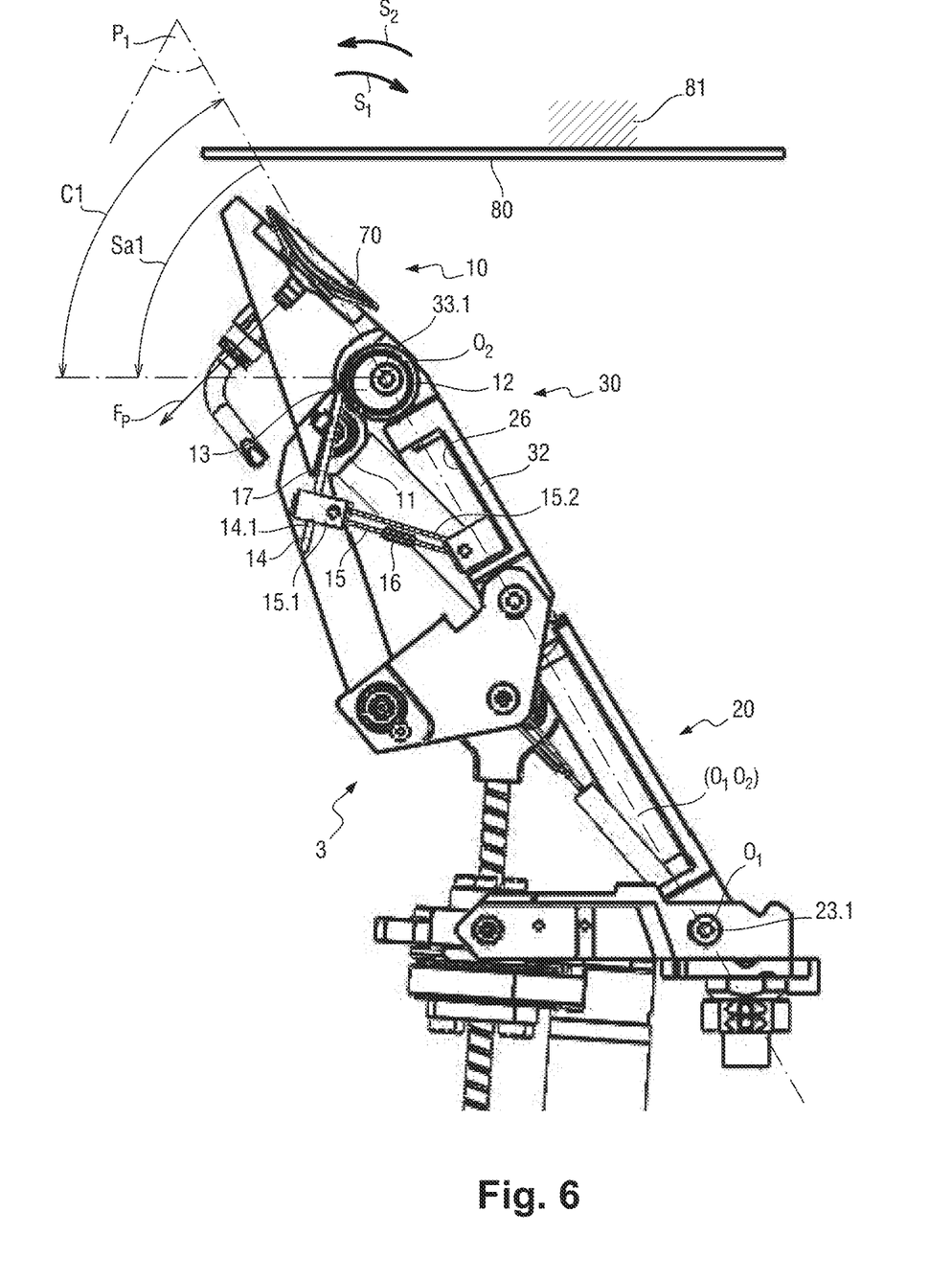
FIG. 6 is a schematic representation of the gripper of FIG. 5 in a first flat gripping phase.
Figure 7:
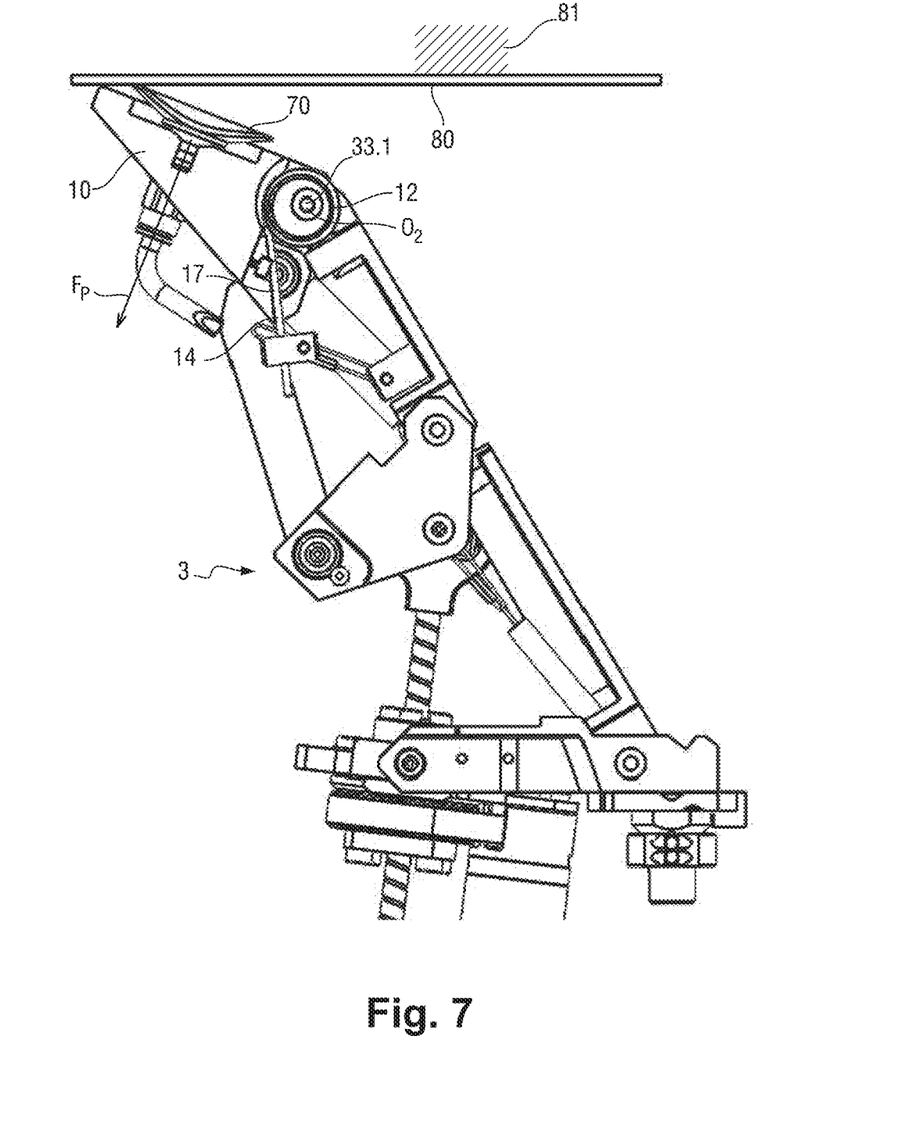
FIG. 7 is a schematic representation of the gripper of FIG. 5 in a second flat gripping phase.
Figure 8:
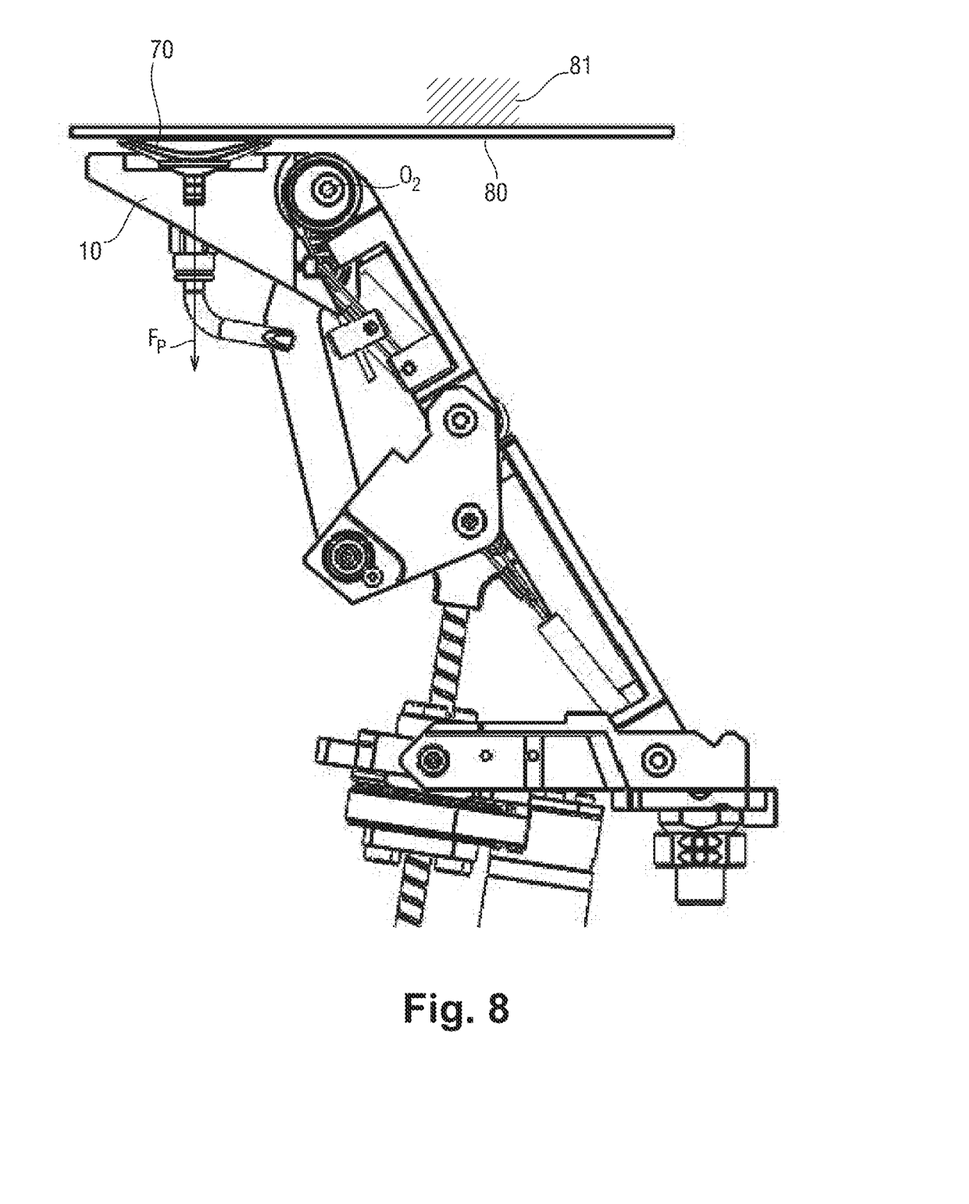
FIG. 8 is a schematic representation of the gripper of FIG. 5 in a third flat gripping phase.
Figure 9:
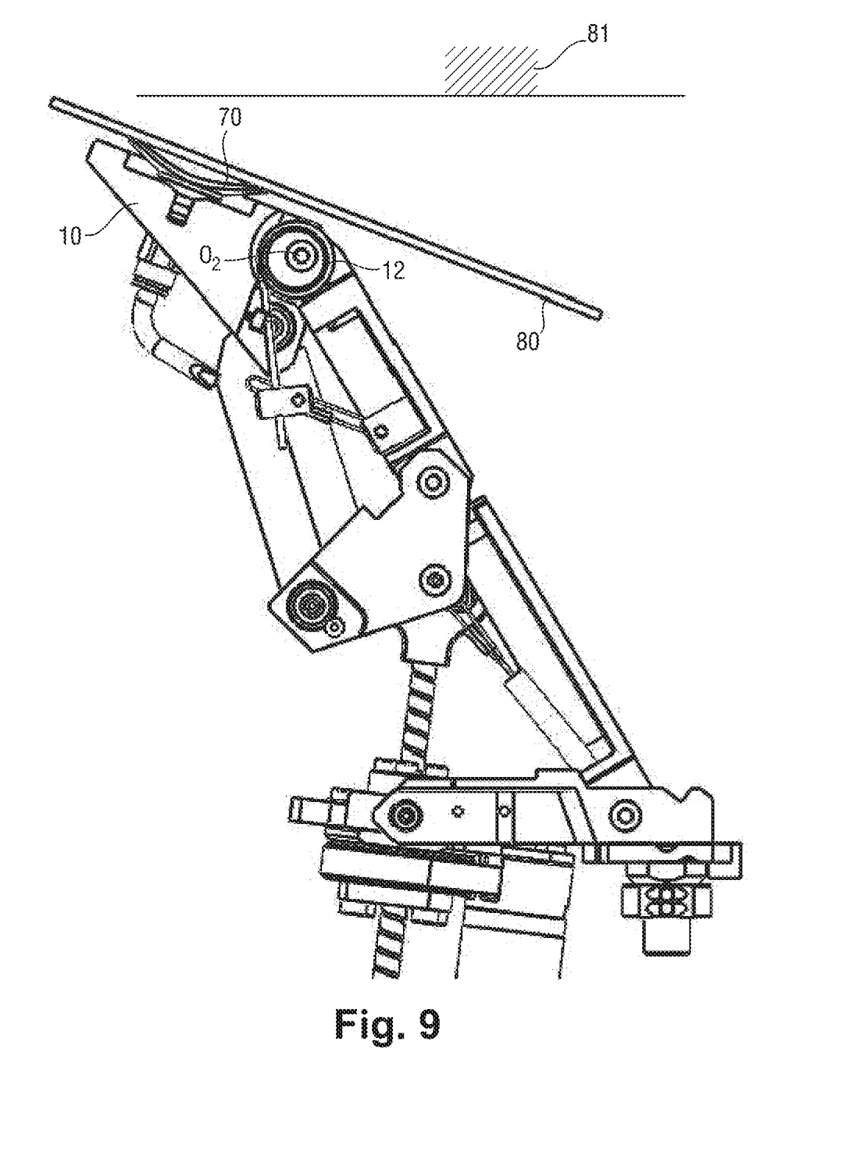
FIG. 9 is a schematic representation of the gripper of FIG. 5 in a fourth flat gripping phase.

According to a second embodiment represented in FIGS. 5 to 7, the phalanx 10 comprises a pneumatic suction cup 70 arranged to exert a gripping force Fp in a direction substantially orthogonal to the first axis. The suction cup 70 is connected to a vacuum pump (not represented) connected to the unit 50.

The phalanx 10 comprises, in this case, an abutment 11 which engages with a surface 26 of the bar 32 to limit a first angular stroke C1 of a first rotation of the phalanx 10 about the axis O2 in the second direction S2. In this case, the angular stroke C1 comprises a first angular sector Sal which is strictly positive in the second direction and measured from the plane P1. The angular sector Sal measures, in this case, sixty degrees.

The finger 3 also comprises a third torsion spring 12 which extends around a shaft 13 for rotatably connecting the phalanx 10 to the phalanx 30. The spring 12 comprises a wire 14, an end 14.1 of which is connected to the first end 15.1 of a cable 15. The second end 15.2 of the cable 15 is connected to the phalanx 20. The length of the cable 15 is adjustable using a cable clamp 16. The wire 14 bears against a surface 17 of the phalanx 10 to exert a third return force, which brings the phalanx 10 from a position located in the first angular sector Sal to a position bringing to the opening configuration of the finger 3 represented in FIG. 1. The length of the cable 15 makes it possible to adjust an over-opening position of the phalanx 10 from which the third return force is exerted. In other words, the rigid abutment 6 of the first embodiment is replaced by an elastic abutment produced by the wire 14. The abutment 11 is, in this case, a first abutment. The spring 12 is, in this case, a second return member exerting a second return force.

FIG. 5 illustrates a use of the gripper 1 according to the second embodiment for the gripping of a cylindrical object 71, a semi-circumference of which is greater than a length of the finger 3.

A particular use of the gripper 1 according to the second embodiment is described in line with the gripping of a second flat object 80 which rests on a support 81 and in reference to FIGS. 6 to 9.

According to a first step, the finger 3 is placed in opening configuration and the phalanx 10 is approached from the object 80. An end of the phalanx 10 comes into contact with the object 80. According to a second step represented in FIG. 7, an approach of the gripper 1 from the object 80 is controlled, which causes a rotation of the phalanx 10 around the point 33.1 in the direction S2. The surface 17 of the phalanx 10 thus bears on the wire 14 and compresses the spring 12. According to a third step represented in FIG. 8, the approach movement of the gripping 1 is continued until the phalanx 10 adopts a position, wherein the suction cup 70 is applied on the object 80. According to a third step, the unit 50 controls the suction cup 70, such that it exerts a gripping force on the object 80. According to a fourth step represented in FIG. 9, an extension of the gripper 1 from the support 81 is controlled. The object 80 is kept secured to the phalanx 10 by the suction cup 70. As the gripper 1 is extended from the support 81, the phalanx 10 performs a rotation about the axis O2 in the direction S1 under the effect of the spring 12.

Such a gripper 1 makes it possible to grip large flat objects and small objects by clamping.

Figure 10:
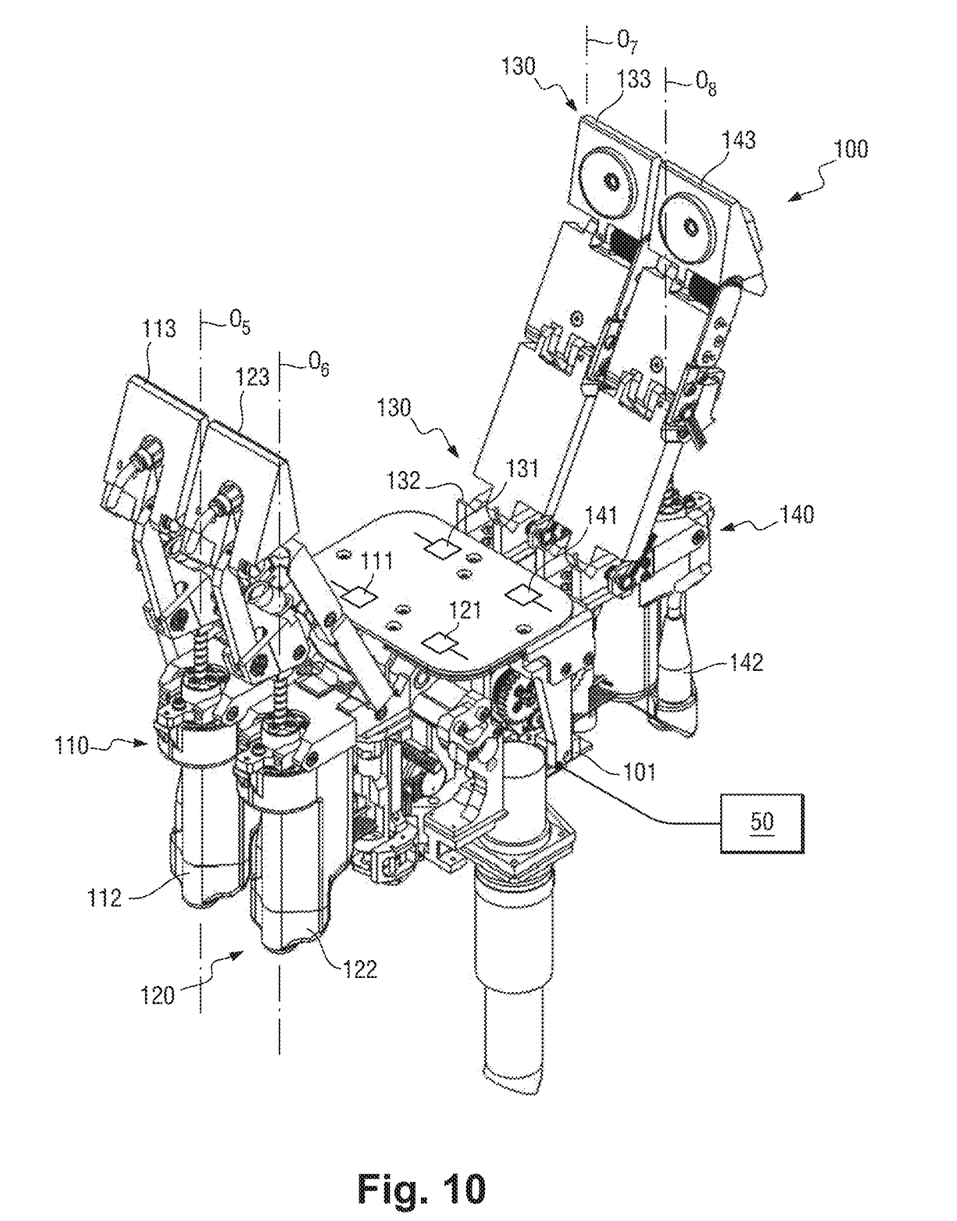
FIG. 10 is a schematic, perspective representation of a gripping device according to a third embodiment of the invention.

According to a third embodiment represented in FIG. 10, a gripping device 100 comprises a first gripper 110, a second gripper 120, a third gripper 130 and a fourth gripper 140, the respective fingers 113, 123, 133 and 143 of which are connected to one same frame 101.

The fingers 113, 123, 133 and 143 are slidingly mounted relative to the frame 101 respectively using a second electric jack 111, a third electric jack 121, a fourth electric jack 131, a fifth electric jack 141, the output rods of which translate in parallel directions. More specifically, the jacks 111 and 121 are arranged, such that their output rods are aligned and are deployed in opposite directions. The jacks 131 and 141 are themselves arranged such that their output rods are aligned and are deployed in opposite directions. The jacks 111, 121, 131 and 141 are connected to the unit 50.

The fingers 113, 123, 133 and 143 are also rotatably mounted relative to the frame 101 respectively using a first geared motor 112, a second geared motor 122, a third geared motor 132 and a fourth geared motor 142 connected to the control unit 50. The fingers 113, 123, 133 and 143 are respectively rotatably mounted to the frame 101 about a fifth axis O5, a sixth axis O6, a seventh axis O7 and an eighth axis O8, vertical according to the representation of FIG. 10.

Figure 11:
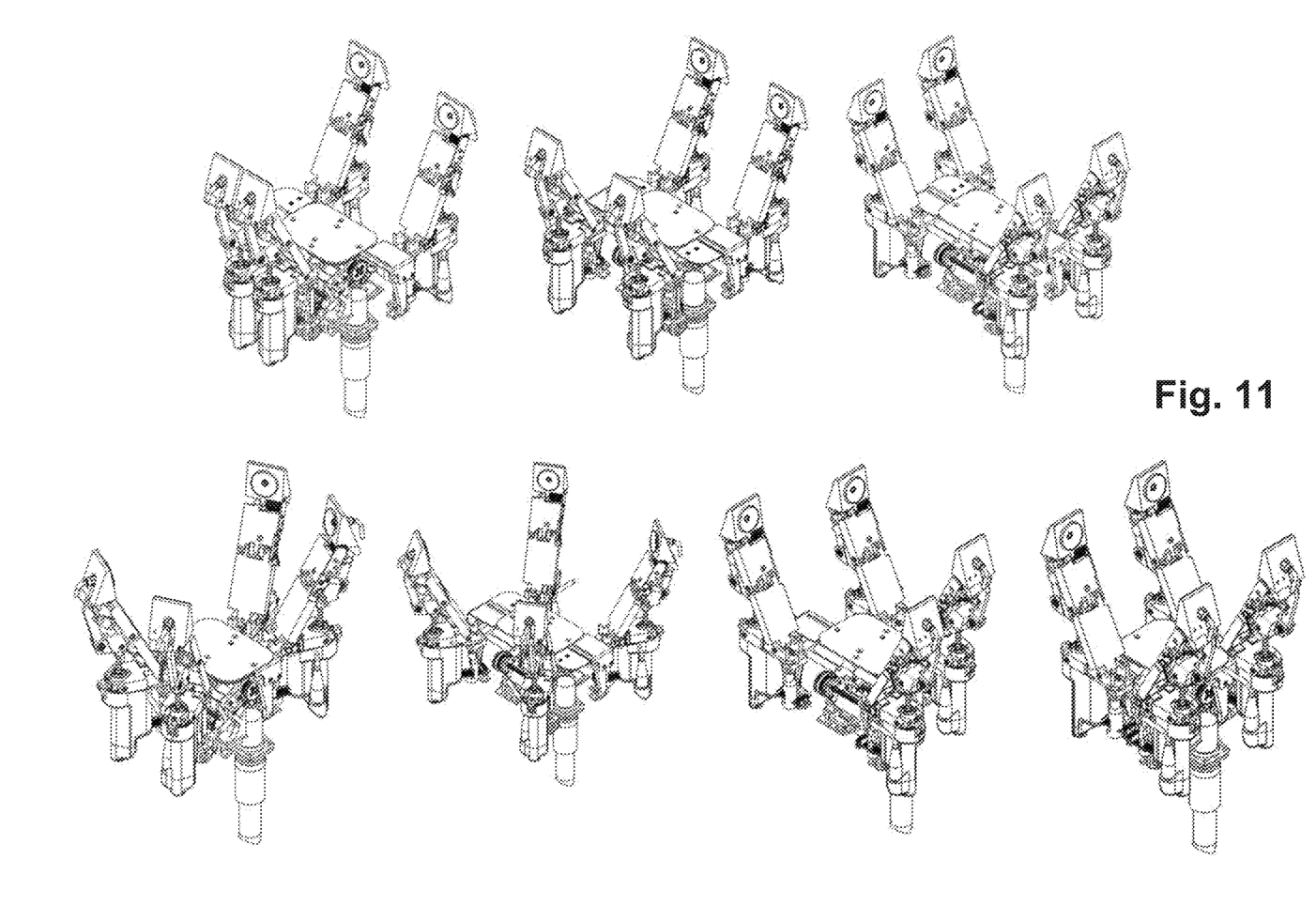
FIG. 11 is a schematic, perspective representation of different configurations of the gripping device of FIG. 10.

The relative arrangement of the fingers 113, 123, 133 and 143 relative to the frame can thus adopt a plurality of configurations represented in FIG. 11 which provides a great versatility to the device 100.

Naturally, the invention is not limited to the embodiment described, but comprises any variant entering into the field of the invention, such as defined by the claims.

In particular,
- although, in this case, the second phalanx has a deformable quadrilateral-type structure, wherein one of the articulated bars comprises the linear actuator, the invention also applies to other types of second phalanx, like for example, a second phalanx having a deformable parallelogram structure integrating an actuator acting on the length of the diagonal of the parallelogram;
- although, in this case, the second phalanx has a deformable quadrilateral-type structure, wherein one of the articulated bars comprises the linear actuator, the invention also applies to other types of second phalanx, like for example, a second phalanx having a deformable parallelogram structure integrating an actuator acting on the length of the diagonal of the parallelogram;
- although, in this case, the gripper comprises one single finger, the invention also applies to a gripper comprising a finger and a fixed obstacle;
- although, in this case, the gripping device comprises four grippers, the invention also applies to a gripping device comprising a different number of grippers, like for example, two grippers, three grippers or more than four;
- although, in this case, the gripping device comprises four grippers, the fingers of which are connected to one same frame, the invention also applies to a gripping device, the frames of the different grippers of which are rigidly connected to or articulated on one another;
- although, in this case, the first and the second phalanx are connected by a third phalanx, the invention also applies to a finger comprising a different number of phalanxes, like for example, a finger comprising a first phalanx that is directly mechanically connected to a second phalanx, or a first phalanx connected to the second phalanx by way of more than one phalanx, like for example, two or three additional phalanxes;
- although, in this case, the second phalanx comprises a first spring, the invention also applies to other types of first member for returning the finger to the opening configuration, like for example, a magnet, a counterweight or an elastic element, other than a spring, like for example, a stack of Belleville-type elastic washers, an elastomer block, even a gas spring;
- although, in this case, the third phalanx comprises a second spring, the invention also applies to other types of third member for returning the finger to the opening configuration, like for example, a magnet, a counterweight or an elastic element, other than a spring, like for example, a stack of Belleville-type elastic washers, an elastomer block, even a gas spring;
- although, in this case, the first phalanx comprises a third spring, the invention also applies to other types of second member for returning the finger to the opening configuration, like for example, a magnet, a counterweight or an elastic element, other than a spring, like for example, a stack of Belleville-type elastic washers, an elastomer block, even a gas spring;
- although, in this case, the return members in the second and third phalanxes are traction springs and that the opening configuration of the gripper is defined by the mechanical balance respectively of the bar 21, the bar 32 and the phalanx 10 in contact with the abutments 4, 5 and 6 under the action of said return members and of the actuator 40, the invention also applies to a gripper comprising bilateral action return members—traction and compression around a zero action central position—in the second and third phalanxes, not comprising abutments 4, 5, 6, and where the opening configuration is defined by a controlled extension length of the actuator and the central positions of the bilateral action return members;
- although, in this case, the finger comprises three rotary coders for measuring the rotations of the phalanxes, the invention also applies to a gripper comprising a different number of rotary coders, like for example, two coders for three articulations—and more generally, a coder of less than the number of phalanxes, the angular position of the last articulation being able to be deduced from the data of the others, and of the geometry of the finger;
- although, in this case, the suction cup is positioned on the first phalanx, the invention also applies to other implantations of the suction cup on the finger, like for example, a suction cup secured to the second or third phalanx;
- although, in this case, the gripper comprises a pneumatic suction cup, the invention also applies to other types of controllable adhesion elements, like for example, a mechanical, magnetic suction cup, an electrostatic effect adhesive member, by Van der Walls-type dry adherence, an electromagnet, or an adhesive which is sensitive to pressure similar to those of repositionable notes;
- although, in this case, the angular sector measures forty degrees, the invention also applies to other values of the angular sector, like for example, an angular sector of between ten and ninety degrees, preferably of between twenty and sixty degrees;
- although, in this case, the fingers are rotatably mounted about a vertical axis, the invention also applies to other orientations of the fourth axis of rotation of the finger relative to the frame, like for example, any orientation and preferably orthogonal and/or secant to the first axis;

although, in this case, the fingers are provided with a rotation movement and with a translation movement with respect to the frame, the invention also applies, if the connection comprised two axes of rotation, enabling the fingers a rotation perpendicular to the palm and adduction/abduction movements, or any other architecture for moving the fingers with respect to the palm;

although, in this case, the third phalanx has a deformable quadrilateral-type structure, the invention also applies to other types of movement transmission structures, like for example, a gear train or a pulley/belt assembly.

The invention claimed is:

1. A gripper comprising a frame and an actuated finger, the finger comprising a first distal phalanx and a second proximal phalanx which is articulated on the frame about a first axis, the first phalanx and the second phalanx being mechanically connected to enable a rotation of the first phalanx about a second axis substantially parallel to the first axis, such that the finger can pass from an opening configuration to a clamping configuration, when the first phalanx and/or the second phalanx performs a rotation in a first direction relative to the frame, the finger comprising a controllable adhesion element, the gripper comprising a first abutment to limit a first angular stroke of a first rotation of the first phalanx about the second axis in a second direction opposite the first direction, the first angular stroke comprises a first angular sector in the second direction and measured from a first plane comprising the first axis and the second axis;

wherein the finger is under-actuated and comprises at least one first member for returning the finger or the first phalanx to an opening configuration of the finger.

2. The gripper according to claim 1, wherein the adhesion element is arranged to exert a gripping force in a direction substantially orthogonal to the first axis.

3. The gripper according to claim 1, wherein the first angular sector is between ten and ninety degrees.

4. The gripper according to claim 1, comprising a second return member of the first phalanx to exert a second return force which brings the first phalanx from a position located in the first angular sector to the opening configuration of the finger.

5. The gripper according to claim 4, wherein the second return member comprises means for adjusting a position of over-opening of the first phalanx from which the second return force is exerted.

6. The gripper according to claim 5, wherein the second return member comprises a spring and the means for adjusting the over-opening position comprise a cable of adjustable length connected to an end of the spring.

7. The gripper according to claim 1, comprising a second phalanx that comprises a first bar comprising a first end and a second end, the second phalanx comprising a linear actuator comprising a third end and a fourth end, wherein the finger comprises a third phalanx connecting the first phalanx and the second phalanx, the third phalanx comprising a second bar comprising a fifth end articulated on the first phalanx and a sixth end articulated on a first connecting rod, the third phalanx also comprising a third bar comprising a seventh end articulated on the first phalanx and an eighth end articulated on the first connecting rod, the first end and the third end being articulated at the first connecting rod.

8. The gripper according to claim 7, wherein a projected orthogonal of the third end on a straight line connecting the first end and the eighth end belongs to a segment connecting the first end and the eighth end.

9. The gripper according to claim 7, wherein the first end is articulated on the sixth end.

10. The gripper according to claim 7, wherein the second phalanx comprises the first return member.

11. The gripper according to claim 7, wherein the third phalanx comprises a fourth member for returning the finger to the opening configuration.

12. The gripper according to claim 1, comprising a second phalanx wherein:

the second phalanx comprises a first bar comprising a first end pivotingly connected to the first phalanx and a second end pivotingly mounted on the frame about the first axis, and the second phalanx also comprises a linear actuator comprising a third end pivotingly connected to the first phalanx and a fourth end pivotingly mounted on the frame, the first bar and the linear actuator being arranged to form a first deformable quadrilateral, wherein a distance separating the third end from the fourth end can be modified.

13. The gripper according to claim 12, wherein the linear actuator comprises a screw jack.

14. The gripper according to claim 12, wherein the linear actuator is connected to the finger and/or to the frame by a sliding pivot-type connection with limited sliding of third axis substantially parallel to the first axis.

15. A gripping device comprising a plurality of grippers according to claim 1.

16. The gripping device according to claim 15, wherein each finger of the plurality of grippers is articulated on its frame about a fifth axis substantially orthogonal to the first axis.

17. The gripping device according to claim 16, wherein, a rotation of each finger relative to the frame about the fifth axis is actuated.

18. The gripping device according to claim 15, wherein each finger of the plurality of fingers is also slidingly mounted relative to the frame.

19. The gripping device according to claim 18, wherein, a translation of each finger relative to the frame is actuated.

20. The gripper according to claim 1, wherein the first angular sector is between twenty and sixty degrees.

21. The gripper according to claim 12, wherein the linear actuator comprises a jack comprising a ball screw.

* * * * *